United States Patent [19]

Gersbacher

[11] 3,995,805
[45] Dec. 7, 1976

[54] BRAZE FIXTURE

[75] Inventor: Harry C. Gersbacher, Dayton, Ohio

[73] Assignee: United Aircraft Products, Inc., Dayton, Ohio

[22] Filed: Sept. 18, 1974

[21] Appl. No.: 507,154

[52] U.S. Cl. .......................... 228/44.1 R; 269/43; 269/236; 269/267
[51] Int. Cl.² .................. B23K 37/04; B25B 1/08
[58] Field of Search ............... 29/200 J, 202 R; 228/44.1 R; 269/43, 236, 267

[56] References Cited
UNITED STATES PATENTS

| | | | |
|---|---|---|---|
| 419,884 | 1/1890 | Richards | 269/267 X |
| 728,450 | 5/1903 | Everett | 269/43 X |
| 2,317,702 | 4/1943 | Wallace | 269/236 X |
| 3,103,353 | 9/1963 | Lassy | 269/236 X |

Primary Examiner—Gary L. Smith
Attorney, Agent, or Firm—J. E. Beringer

[57] ABSTRACT

A fixture for holding parts to be joined together in which a frame-like structure provides a seating surface for an assembly of parts. A cam acting lever is adjustable to exert single point pressure, and means comprised in the structure transmits such single point pressure to multiple pressure points applied uniformly in a seating or clamping of the assembly of parts to the seating surface. In the illustrative embodiment a plurality of pressure applying members is in an approximate linear orientation and functions best in connection with an assembly of parts presenting a flat pressure receiving surface.

7 Claims, 6 Drawing Figures

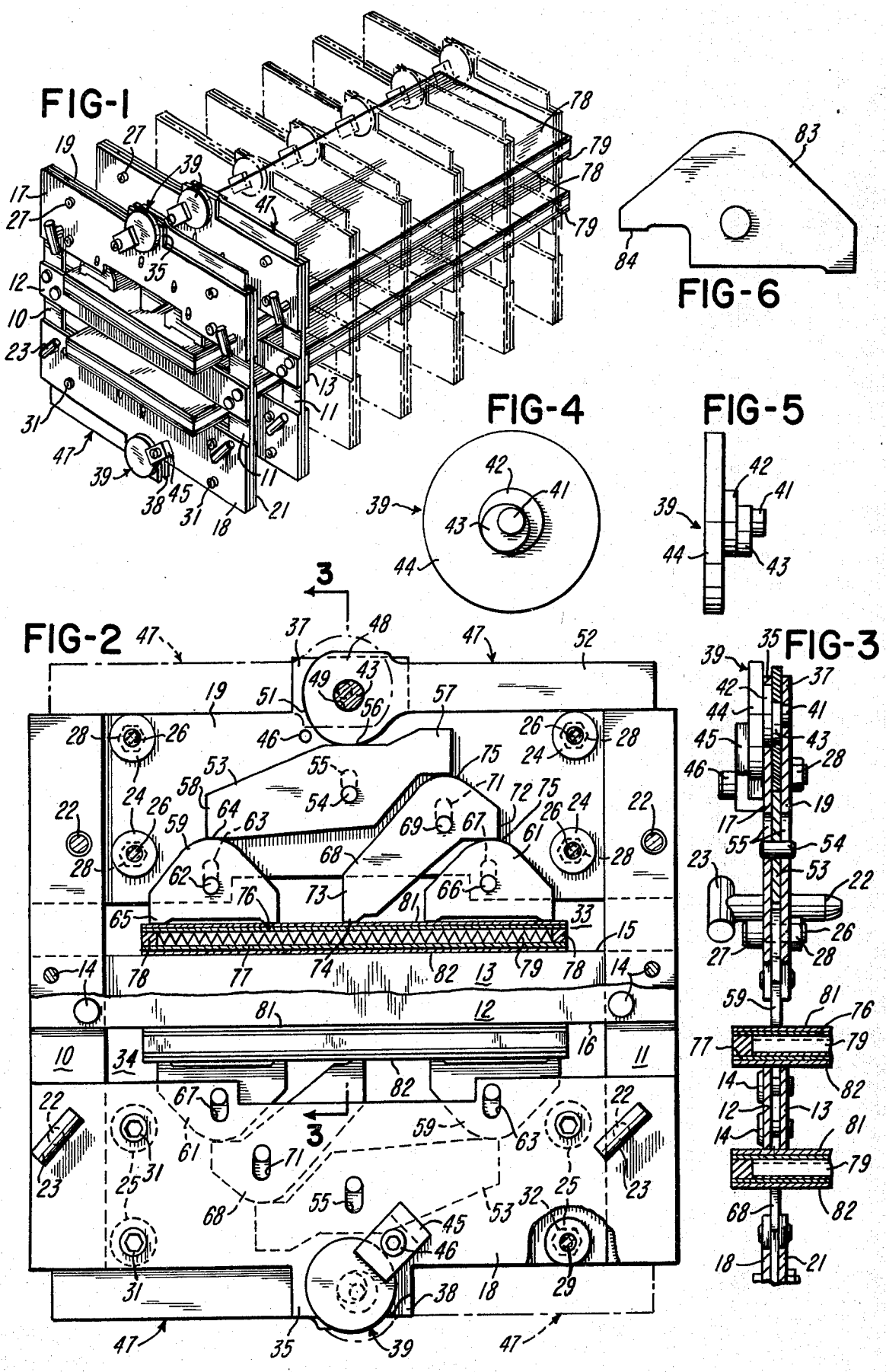

BRAZE FIXTURE

BACKGROUND OF THE INVENTION

Although not so limited, this invention has particular reference to the brazing of plate type heat exchangers where plates, spacer elements and extended surface fin means are stacked in an assembled relation and joined together in a furnace brazing, dip brazing or like operation. Preparatory and during brazing the assembly of heat exchanger parts is held in a fixture, and it is toward improvements in this fixture that the instant invention, in its illustrative embodiments, is directed.

The purpose of the so-called braze fixture is not only to hold the parts in an assembled relation but to exert a holding pressure which is evenly distributed and uniformly applied. It is the objective to insure that in all affected joints the parts are in continuous contact with one another. In this manner the formation of tight, leak-free joints can reasonably be expected and the heat exchanger made strongly resistant to rupture from internal pressure. Plate type heat exchangers of substantial breadth or length, or both, pose special problems in this regard because of the length of involved joints. The use of relatively heavy flat plates as a part of the braze fixture has been known but these tend to bow when clamped and are not practicably constructed to the necessary precision of dimension. The use of hold down screws, in conjunction with superposing plates, is known but adjustment and readjustment of numerous screws is time consuming and no means exists for obtaining uniformity and continuity of adjustment.

SUMMARY OF THE INVENTION

The instant invention provides a braze fixture in which an accommodated assembly of parts can be gripped and released by actuation of a single means, obviating use of multiple screws and the like. Further, a concept of distributed, uniformly applied pressure is provided for in which pressure applied at a single location is transmitted uniformly and automatically to a plurality of other locations. A braze fixture or the like according to the invention provides at least one seating surface. A hand operated lever or the like generates single point seating pressure and a plurality of pressure applying members utilizes the single point seating pressure to exert multiple point pressure urging the assembly of parts to the seating surface. The pressure applying members are in an approximate linear orientation and are particularly applicable to flat surface assemblies.

It is an object of the invention to provide a braze fixture characterized substantially as in the foregoing.

Other objects and structural details of the invention will appear from the following description when read in connection with the accompanying drawings, wherein:

FIG. 1 is a view in perspective of plural braze fixtures in accordance with a first illustrated embodiment of the invention applied to assemblies of parts to be brazed;

FIG. 2 is a view in front elevation, partly broken away, of a braze fixture as shown in FIG. 1;

FIG. 3 is a view in cross section, taken substantially along the line 3—3 of FIG. 2;

FIG. 4 is a detail view of an eccentric mounting a cam lever;

FIG. 5 is a further detail view of the eccentric mounting; and

FIG. 6 is a detail view of an alternate form of pressure applying member.

A braze fixture in accordance with an illustrated embodiment of the invention includes laterally spaced apart flat bars 10 and 11 interconnected at their middles by like bars 12 and 13 which superpose relatively to one another to opposite faces of the bars 10 and 11. Rivets 14 secure the assembly of bars into a rigid, H-shaped frame. In such frame, upper edges of cross bars 12 and 13 are in a common horizontal plane and define a seating surface 15. Lower edges similarly are in a common horizontal plane and define a seating surface 16 facing oppositely of surface 15.

In the same vertical plane as cross bar 12, and applied to a corresponding face of bars 10 and 11, are upper and lower mounting plates 17 and 18. Like plates 19 and 21 apply to the opposite face of bars 10 and 11. The plates 17, 18, 19 and 21 are removably mounted to the H-shaped frame, for reasons which will hereinafter more clearly appear. Aligning holes in the plates, and in the bars 10 and 11, provide for the insertion of dowels 22. These have cross members or handles 23 to their one ends to facilitate installation and removal. The dowels 22 serve two purposes in that they precisely position the mounting plates on the H-shaped frame and in that they enable the plates easily to be removed and reapplied.

The arrangement provides what may be regarded as an upper set of mounting plates 17 and 19 and a lower set of mounting plates 18 and 21. Between the bars 10 and 11, the plates of each set are spaced apart a distance corresponding to the thickness of the bars. So that the spacing may be rigidly maintained, spacers 24 are installed between plates 17 and 19 and like spacers 25 installed between plates 18 and 21. Through bolts 26 mount the spacers 24 and have relatively large, accessible heads 27 for easy turning. Nuts 28 apply to ends of the bolts 26 opposite heads 27. The spacers 25 are held in place by like bolts 29 having like heads 31 and carrying like nuts 32.

The mounting plates effectively close off a major part of the open space in the H-frame above and below the middle cross bars 12 and 13. Edges of the plate adjacent to the cross bars are spaced therefrom, the result being to define what may be regarded as upper and lower through slots 33 and 34 immediately above and below the middle cross bars. Opposite side edges of the mounting plates have respective projecting ears, 35, 36, 37 and 38, the ears of each set of plates aligning with one another.

Plates 17 and 18 are identical to one another, as are plates 19 and 21. Moreover, sets of plates 17 and 19 and 18 and 21 cooperate with one another in a like manner to mount or support like parts. A description of one set of plates and mounted parts accordingly will suffice for both. Thus, and considering plates 17 and 19, the ears 35 and 37 are apertured in order rotatably to mount an eccentric means 39. One end of the eccentric means 39 is formed as a relatively small diameter stud 41 accommodated in an aperture of corresponding size in the ear 37 of plate 19. Adjacent to its opposite end the eccentric means 39 is formed with a stud portion 42 accommodated in an aperture in the ear 35 of plate 17. Stud portions 41 and 42 have a differential diameter but are formed about a common axis and are accommodated in differentially sized apertures in respective plate ears. Between the stud portions 41 and 42 is a bearing portion 43 formed about an axis offset relatively to the common axis of stud portions 41 and 42. The extremity of the eccentric means, opposite stud portion 41, is expanded to form a head 44 which positions outside and limits against ear 35. Head 44 accordingly is accessible for rotary adjustment of the eccentric means. Means including an arm 45 and a hold down screw 46 are provided which function to maintain the eccentric means 39 in position and to maintain a rotary set portion of adjustment thereof.

Bearing portion 43 of eccentric means 39 locates between ears 35 and 37 where it provides a mounting for a cam lever 47. The latter has a head portion 48 in which is an aperture 49 receiving bearing portion 43. From aperture 49 the head is formed to a changing radius resulting in a camlike periphery 51. A relatively elongated handle 52 projects normally to overlie the upper edges of plates 17 and 19 and accordingly is accessible to be raised and lowered whereby to oscillate head 48 about bearing portion 43.

Between the plates 17 and 19, and immediately below cam lever 47, is a pressure transmission member 53. Studs 54 on the member 53 position in slots 55 in plates 17 and 19 and permit member 53 to move in a pivotal sense relatively to the mounting plates as well as to have a capability of limited bodily movement in a vertical sense. The member 53 is in the same vertical plane as cam lever 47 and on its upper edge provides a surface 56 adapted to be contacted by peripheral cam 51. From surface 56 the member extends at one end to form a projecting finger 57 and extends at its other end to form a relatively depressed tail portion 58. Member 53 is a bridging lever.

Also between the mounting plates are pressure applying members including a pair of identical members 59 and 61. The member 59 is pivotally and bodily movable relatively to the plates 17 and 19 as a result of cooperation between studs 62 and slots 63 in the same manner as member 53 is movable. An upper end of member 59 converges to form a surface 64 engaged by tail portion 59 of member 53. At a lower end, member 59 projects through and beyond the plane of the lower edges of plates 17 and 19 into slot 33. On such lower end, portions of the member 59 are projected to form spaced apart pads 65. Member 61 is laterally spaced apart from member 59 and has studs 66 received in slots 67 to be mounted like member 59. At its upper end, the member 61 is contacted indirectly by the pressure transmitting member 53, there being interposed between finger portion 57 and the pressure receiving surface at the upper end of member 61 an intermediate pressure applying member 68. The member 68 is mounted like the members 53, 59 and 61 in that integral studs 69 are received in vertical slots 71 in the mounting plates. A forwardly projecting finger portion 72 directly engages the pressure receiving surface on member 61. A relatively depressed tail portion 73 depends to lie in substantially the same plane as the lower edges of pressure applying members 59 and 61 and has a foot or pad 74 corresponding to the pads 65. An upper surface 75 of the member 68 is directly engaged by the finger portion 57 of the member 53.

As will be apparent, the arrangement is one in which the cam lever 47 may be rocked to and fro to apply and to release pressure through the several members 53, 59, 61 and 68. Moreover, a pressure applied at a single location on surface 56 of member 53 is distributed evenly and with uniform effect to a plurality of locations as represented by the several feet or pads on pressure applying members 59, 61 and 68. In the use of a braze fixture as disclosed, an assembly of parts to be joined together is installed in the slot 33 and a like assembly installed in slot 34. This may be accomplished merely by inserting preassembled parts into the respective slots or may be expeditiously accomplished by removing the mounting plates and associated parts from the H-frame and the reinstalling the mounting plates after the parts to be jointed together have been placed in an abutting relation to opposite faces of the cross bar 12-13. In this latter connection, it will be understood that the cross bar 12-13 acts as a reactant means providing a seat to which the assembled parts to be joined together are forcibly urged by pressure applied through the several pressure applying members 59, 61 and 68. The arrangement simplifies the structure of the reactant means required and enables the fixturing and brazing of two sets of parts simultaneously of one another. In the positioning of the parts, the cam lever 47 is adjusted to a generally vertical or raised position, in which position, as will be evident from an examination of the cam periphery 51, the pressure transmitting and pressure applying members are in a released position free for limited movement in a vertical sense. With the parts to be joined properly positioned in the slots 33 and 34, however, the cam levers 47 are adjusted downwardly to occupy a position substantially as illustrated. In the course of this movement, a portion of the head 48 of the cam lever of greater radius is brought to bear on surface 56 of member 53. Downward or inward pressure is exerted on the several members comprised in the mounting plates and the feet or pads on the pressure applying members press against the work and seat it firmly to the cross bar 12–13. The parts to be joined together accordingly are firmly gripped or clamped within the braze fixture and are so held during the brazing process. In this connection, it will be noted that the pressure applying members are arranged to make frequent and generally continuing contact across the width of the assembly of parts to be joined with the result that the parts are urged to an intimately contacting relation to one another substantially uniformly across their width.

The invention is complete in the presence of a single braze fixture. However, and as indicated in FIG. 1, the fixture lends itself to use in multiple units so that proper fixturing of an assembly of parts of elongated length may be effected. In the illustrated instance, a heat exchanger assembly comprised of spaced apart plates 76 and 77, spacer elements 78 and intermediately disposing fin means 79 having a secondary heat transfer function is shown gripped by plural braze fixtures in accordance with the invention. To avoid marring the surface of plates 76 and 77, and for a better distributed pressure, fixture plates 81 and 82 superpose over the heat exchanger plates 76 and 77 and are directly engaged by the pressure applying members and by the seating surfaces of cross bar 12-13. With the pressures exerted by the several braze fixtures, the plates 76 and 77 are caused to press against the spacers 78 and uniformly to engage adjacent peaks of the fin material 79. As a result, in the brazing process, the plates are unitarily joined to the spacers 78 and likewise form continuing joints with the peaks of fin material 79, so that the entire heat exchanger achieves a unit form and is strongly resistant to separation from any of the causes normally contributing to heat exchanger failure.

The inventive concept lends itself to structural modification, as for example in the configuration of the pressure applying members. As shown in FIG. 6, for example, a member 83 is shown which is the same as members 59 and 61 except that to one side thereof the member is cut away so that the pad 84 corresponding to pad 65 is relatively elevated. In this manner, irregularities in the surface of a heat exchanger plate, as for example mounting bosses or the like, can be accommodated. In such an instance, a fixturing plate 81 and 82 is formed with an opening to allow the boss to project therethrough and a pressure applying member 83 is substituted for a member 59 or 61 so that an upper end of the boss can be engaged by a relatively elevated pad 84.

The braze fixture of FIGS. 1 to 6 has particular application to work assemblies providing a flat pressure receiving surface, although irregularities can be accommodated as discussed in connection with the part of FIG. 6.

The invention has been disclosed with respect to particular embodiments. Structural modifications have been discussed and these and others obvious to a person skilled in the art to which this invention relates are considered to be within the intent and scope of the invention.

What is claimed is:

1. A fixture used in multiple form to grip and to hold superposed plate type heat exchangers for brazing, including
    a. an H-shaped frame,
    b. plate means including a pair of plates fixed to opposite faces of laterally spaced uprights of said frame both above and below the cross member thereof and in spaced relation thereto,
    c. said cross member having upper and lower edges defining opposed seating surfaces,
    d. said seating surfaces cooperating with confronting edges of respective pairs of plates to form slots above and below said cross member accommodating the insertion therein of respective heat exchangers,
    e. means on and relatively movable to each pair of plates to make multiple contact with a respective inserted heat exchanger, said relatively movable means comprising an arrangement of pressure applying members slidably and tiltably mounted between each pair of plates in a plane common to one another and to laterally spaced uprights of said frame,
    f. and other means associated with each pair of plates and reacting thereon adjustable to effect a pressural engagement of the relatively movable means with a respective heat exchanger, urging it to a seat on a respective seating surface, said other means associated with each pair of plates and reacting thereon being received between a respective pair of plates and positioning in and being adjustable in said common plane.

2. A fixture according to claim 1, wherein said other means includes
    a. an oscillatory cam received between each pair of plates, a transmission member between said cam and said pressure applying members,
    b. a manipulative lever accessible outside the limits of said frame and plates thereon to oscillate said cam,
    c. a rotatably adjustable eccentric mounting said cam, and
    d. means for releasably locking said eccentric in rotary positions of adjustment.

3. A fixture used in multiple form to grip and to hold superposed plate type heat exchangers for brazing, including
    a. an H-shaped frame,
    b. plate means including a pair of plates applied to opposite faces of laterally spaced uprights of said frame both above and below the cross member thereof and in spaced relation thereto,
    c. said cross member having upper and lower edges defining opposed seating surfaces and comprising a pair of cross bars applied to opposite faces of said laterally spaced uprights in opposing relation to one another, a respective cross bar and the plates above and below it being in a common plane,
    d. said seating surfaces cooperating with confronting edges of respective pairs of plates to form slots above and below said cross member accommodating the insertion therein of respective heat exchangers,
    e. means relatively movable on each of said pairs of plates to make multiple contact with a respective inserted heat exchanger, said relatively movable means comprising an arrangement of pressure applying members slidably and tiltably mounted between each pair of plates in a plane common to one another and to laterally spaced uprights of said frame,
    f. and other means associated with each pair of plates and reacting thereon adjustable to effect a pressural engagement of the relatively movable means with a respective heat exchanger, urging it to a seat on a respective seating surface, said other means associated with each pair of plates and reacting thereon being received between a respective pair of plates and positioning in and being adjustable in the plane commonly occupied by said pressure applying members.

4. A fixture according to claim 3, characterized by means securing said cross bars to said laterally spaced uprights to form a rigid H-frame.

5. A fixture according to claim 4, characterized by means for releasably mounting said plates to said H-frame.

6. A fixture according to claim 5, wherein said means for releasably mounting said plates includes dowel means having a press fit to aligning apertures in said plates and in said laterally spaced uprights of said frame, said dowel means being headed for simplified insertion and removal by hand.

7. A fixture according to claim 3, wherein said laterally spaced uprights are flat planar members allowing a relatively close approaching relation of opposed plates, said pressure applying members being received between opposing plates in substantially sliding contact therewith.

* * * * *